May 30, 1967 R. L. SYLVESTER 3,322,286
GREEN TIRE TRUCK
Filed March 29, 1965 2 Sheets-Sheet 1

ROWLAND L. SYLVESTER.
INVENTOR.

BY Eugene C. Knoblock
ATTORNEY.

May 30, 1967  R. L. SYLVESTER  3,322,286
GREEN TIRE TRUCK
Filed March 29, 1965                      2 Sheets-Sheet 2

ROWLAND L. SYLVESTER,
INVENTOR.

BY
Eugene C. Knoblock
ATTORNEY.

United States Patent Office 3,322,286
Patented May 30, 1967

3,322,286
GREEN TIRE TRUCK
Rowland L. Sylvester, 962 Riverside Drive,
South Bend, Ind. 46616
Filed Mar. 29, 1965, Ser. No. 443,570
6 Claims. (Cl. 211—24)

This invention relates to improvements in green tire carrier means, and particularly means for carrying radial green tires with imbedded wire reinforcements in the carcass or body thereof.

In the manufacture of vehicle tires it is customary to assemble the components of a tire in one location and to cure the tire in a different location. This requires transport of the uncured or green tire from the assembly point to the cure point.

Green tires are very fragile and care must be taken to avoid injury thereto or misshaping thereof during handling of such a nature as will prevent compliance thereof with specifications for a top grade tire. Thus it is essential that no stresses be applied to the tire which would cause reinforcing wires used therein, as in the carcass or body thereof, to take a set which would cause the tire to be out of round or which would prevent it from maintaining the desired shape and configuration when it had been cured.

Heretofore it has been proposed to support green tires upon prongs. One device of this character is shown in my Patent No. 3,147,864, dated Sept. 8, 1964. Such devices provide a limited area of support for the tire, but have the advantage of accommodating tires of different sizes.

It is the primary object of this invention to provide means for supporting a green tire at the outer circumference thereof so as to distribute the weight of the tire over a large area and to avoid localization of supporting stresses.

A further object is to provide a device of this character capable of supporting tires of different diameters at their outer circumference by means conforming to the tire and in a manner to avoid distortion of the supported tire.

A further object is to provide a device of this character having a sling adapted to support a tire thereon and means for adjusting the sling to permit it to accommodate itself to the shapes and configurations of tires of different sizes.

Other objects will be apparent from the following specification.

Figure 1:
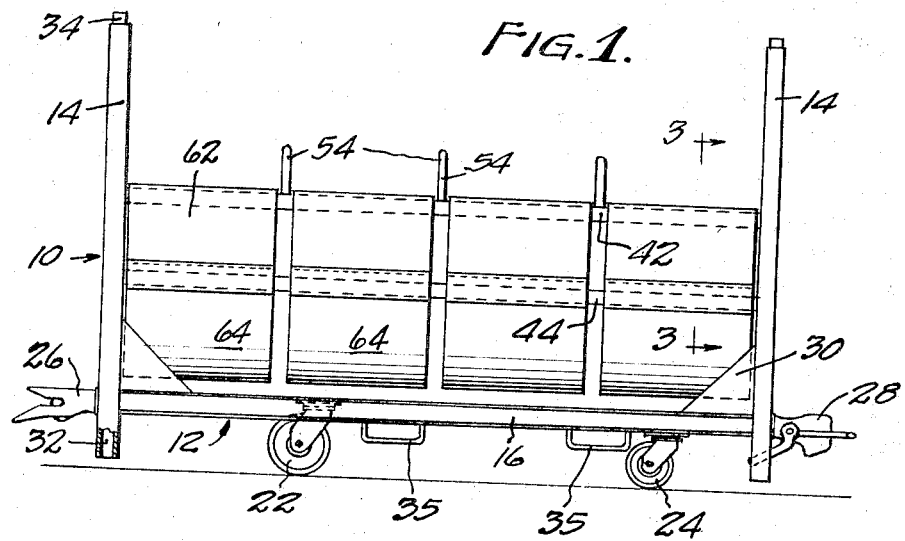
FIG. 1 is a side view of a carrier embodying my invention.
Figure 2:
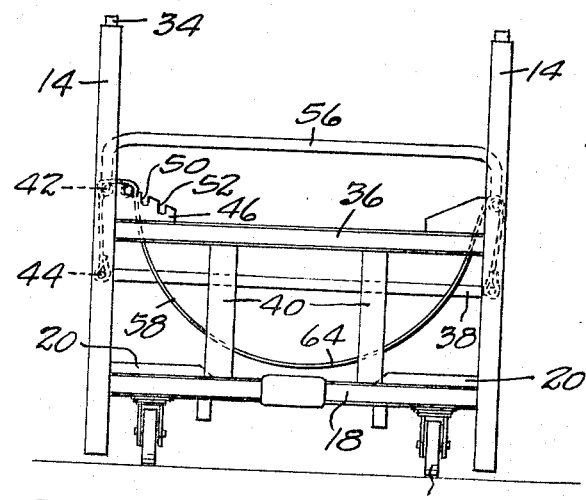
FIG. 2 is an end view of the carrier.
Figure 3:
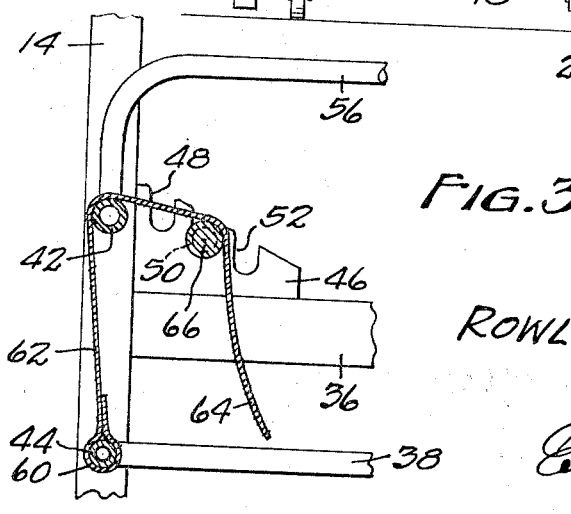
FIG. 3 is an enlarged fragmentary detail sectional view taken on line 3—3 of FIG. 1.

Referring to the drawings, and particularly to FIGS. 1 to 3, which illustrate one embodiment of the invention, the numeral 10 designates a carrier in the nature of a truck having a bed 12 supporting a superstructure including corner posts 14. The bed 12 is provided with longitudinal frame members 16 and transverse members 18 welded or otherwise secured together to provide a rigid bed. The bed may be provided with suitable supports 20 for mounting wheels, casters, or like running gear 22 and 24. If desired, hitch means 26 and connectors 28 may be carried by the frame at opposite ends thereof and interengageable or capable of being interconnected to tractors or other towing vehicles and to each other for ready transport or movement from place to place.

The uprights 14 are rigid and are firmly anchored to the bed 12 at or adjacent the four corners of the frame, as by welding and by the use of gusset plates 30. The uprights 14 are preferably tubular and project below the bed 12 at 32. The upper ends of the uprights preferably include reduced dimension projections 34 at their upper ends to accommodate stacking of the carriers by interfitting support of the lower ends 32 of the uprights of a stacked carrier upon the reduced upper projections 34 of a lower carrier. The bed may be provided with stirrups 35 to receive the fork arms of a fork lift truck.

The uprights 14 at each end of the carrier are interconnected by transverse frame members 36 and 38 which may be fixedly connected to the bed frame part 18 by members 40. Thus the uprights 14 at each end, together with the parts 36, 38, and 40, define rigid and structures fixedly supported at the respective ends of the bed 12.

The opposite rigid end structures are fixedly interconnected by upper longitudinal bars 42 and lower longitudinal bars 44 at one side thereof and are otherwise suitably interconnected at the other side thereof, preferably by similar upper and lower bars. The upper bars 42 are located at a level spaced above the transverse frame members 36. At each end of the carrier adjacent the upper bar 42 is mounted a notched gusset plate 46 preferably welded to the adjacent upright 14 and transverse member 36. The upper edge of each plate 46 is preferably beveled or inclined and has formed therein a plurality of notches, such as 48, 50 and 52 spaced from the adjacent corner post 14 different dimensions, as illustrated in FIG. 3. Each notch has its bottom or seat spaced from the adjacent transverse member 36 a distance different than the spacing of the bottoms of the other notches from member 36.

One or more separator bars 54 extend transversely of the carrier intermediate the ends thereof, and end bars 56 are located adjacent opposite ends of the carrier at substantially the same level as the separator bars 54. The bars 54 and 56 are spaced above the level of the transverse members 36 and the notched gusset plates 46. As here shown in FIGS. 1 and 3, the separator bars 54 are preferably of inverted U-shape and are welded at selected points along the length of the upper longitudinal bars 42.

A plurality of flexible sheet or web members 36 are mounted on the carrier. In the preferred arrangement, each end of each sheet member defines a loop at 60 encircling a longitudinal member 44. The end portions 62 of the sheets extend upwardly from the loops 60 to pass over the upper longitudinal bars 42. The central portion 64 of each sheet is suspended between the upper supports 42 to form a supporting sling, upon which the outer periphery of one or more green tires may be supported in upright position. The tires are maintained in upright position by the separator bars 54 and the end bars 56.

It is desirable that the sling support the outer periphery of the tire for approximately one-half of its circumferential extent. In order to accommodate the device to this requirement when the device is used for storing tires whose outer circumference is substantially less than the spacing between the upper sling supporting bars 42 at opposite sides of the truck, a bar 66 is mounted removably in a selected one of the notches 48, 50, 52 at the opposite ends of the device so as to position the bar 66 parallel to the adjacent longitudinal bar 42. The bar 66 supports the sheets or webs adjacent to and inwardly spaced from one of the longitudinal members 42 and thereby accommodates suspension of the central sling portion of the sheet at points spaced apart slightly more than the diameter of the tire to be supported, thereby assuring that the supported tire resting thereon will be supported by the sling through the major portion of the lower half thereof as a result of the assumption by the flexible sheet of a shape conforming to the arc of the outer circumference of the tire.

It will be seen that this device permits support of a plurality of tires by sling means cradling the same through a major part of the lower circumferential half thereof. The separator bars hold the tires vertical or substantially vertical upon the carrier. It will also be observed that where a plurality of sheets are utilized, as illustrated in FIG. 1, each extending between adjacent separator bars 54 or between a separator bar 54 and an end bar 56, it is possible to accommodate transport upon the same carrier of tires of different circumferential dimension while providing substantially equal circumferential support for each tire regardless of its diameter. This result, of course, requires the use of positioning bars 66 of short length supported at opposite ends thereof adjacent the separator bars 54 and the end bars 56. It is preferred, however, to utilize each carrier for tires of one size only and to utilize a positioning bar 66 extending full length of the carrier to similarly position all sling sheets 58 upon a given carrier. The large area and circumferential extent of support of each tire and the means for maintaining the tires in upright position serve effectively to protect green tires against deformation thereof while being transported.

Figure 4:
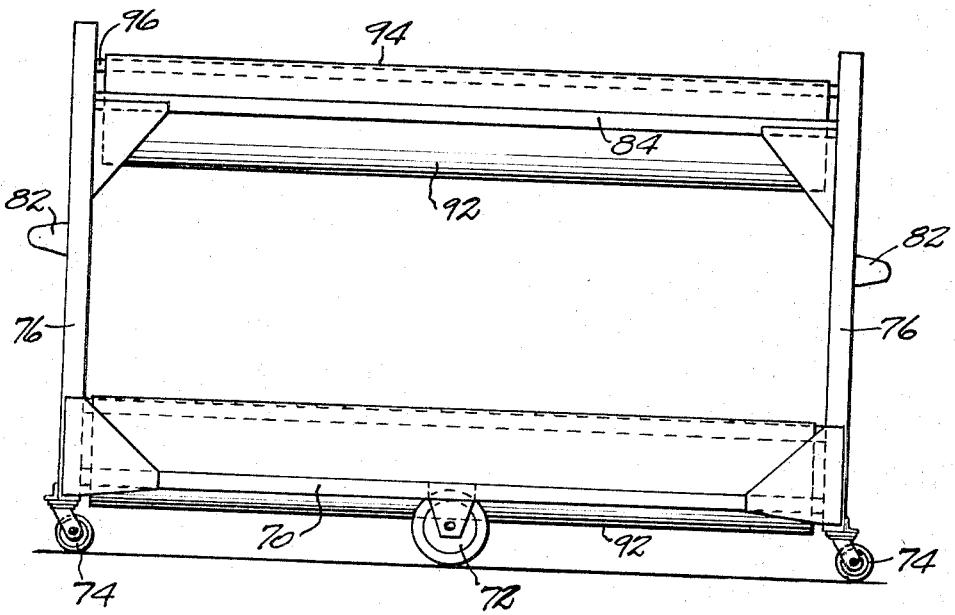
FIG. 4 is a side view of a modified embodiment of the invention.
Figure 5:
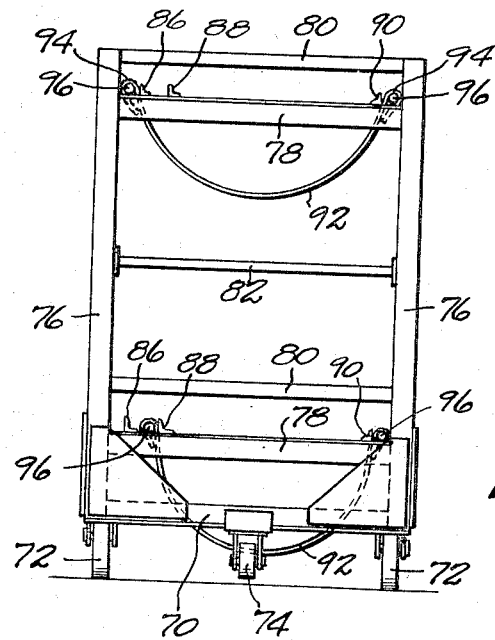
FIG. 5 is an end view of the embodiment illustrated in FIG. 4.

A modified embodiment of the invention is illustrated in FIGS. 4 and 5, wherein a truck-type carrier unit has a rigid bed 70 centrally supported by wheels 72 and supported at its ends by castors 74. A superstructure is carried by the bed and fixed and rigid thereon and includes uprights 76 located at or adjacent each corner of the bed. The uprights at each end are interconnected by one or more transverse frame members 78 and by transverse positioning bars 80 located spaced above each transverse frame member 78. The lowermost transverse frame member 78 is located spaced above the bed 70 and, where multiple transverse frame members 78 are provided at each end, they are spaced apart a distance substantially greater than the diameter of the tire to be supported in the device. If desired, the uprights at each end may also be interconnected by handle means 82. Longitudinal bars 84 rigidly interconnect the opposite end portions of the superstructure, being located at opposite sides of the carrier and spaced above the bed 70 thereof.

Each of the transverse frame members 78 is provided with one or more abutments adjacent each end thereof. As here shown, the abutments constitute parts, such as 86, 88 and 90, carried by and projecting above the upper surface of the transverse members and cooperating therewith to define seats spaced inwardly at selected distances from the adjacent frame uprights 76.

A long sling sheet 92 has its sides looped at 94 to receive rigid elongated bars or rods 96 of greater length than the sling sheet and adapted to span the space between transverse frame members 78 at opposite ends of the carrier to be supported thereby. The sheet will preferably extend substantially full length of the carrier, terminating adjacent to and preferably slightly spaced from the adjacent end uprights 76.

It will be seen that, when the sling sheets 92 are supported upon the rods 96, they are suspended therefrom to assume substantially semicircular shape providing circumferential support for the lower part of tires resting thereon. The curvature of this support conforms to the curvature of the tire circumference and the extent of circumferential support is determined by the spacing of the bars 96. This spacing can be controlled by positioning the ends of the rods upon the transverse members at selected positions as determined by the abutments engaged thereby. Thus it will be seen in FIG. 5 that a wide spacing is provided when the bars 96 are positioned outwardly of the abutments 86 and 90, thereby accommodating tires of one diameter, and tires of smaller diameter are accommodated by the arrangement shown at the lower part of FIG. 5, wherein the positions of the bars 96 are determined by the abutments 88 and 90 which are spaced a distance less than the spacing of the abutments 86 and 90.

The device has been found effective for the purpose of providing maximum circumferential support of a green tire in a manner to avoid deforming thereof and to insure ready transportation safely of green tires with minimum need for accuracy of placement of tires into the device. Consequently, the tires can be handled rapidly by unskilled or semi-skilled workers with assurance that the supporting webs of the carrier will conform themselves to the circumference of the tires for distribution of support of the weight of the tires over a large area so that distortion of the tires will be avoided.

While the preferred embodiments of the invention have been illustrated, it will be understood that other embodiments may be made within the scope of the appended claims.

I claim:
1. A green tire carrier comprising
   a rigid frame having a bed and a superstructure,
   a flexible web anchored to said superstructure adjacent opposite margins thereof by spaced rigid means to define a tree-supporting sling spaced above said bed,
   said web being of a dimension greater than the spacing of said anchorage means, whereby it sags therebetween,
   at least one web anchoring means being removably mounted on said superstructure, and
   anchor positioning means on said superstructure defining a plurality of seats selectively engageable by said removable anchoring means.
2. A green tire carrier comprising
   a rigid frame having a bed and a superstructure,
   a flexible web anchored to said superstructure adjacent opposite margins thereof by spaced rigid means to define a tire-supporting sling spaced above said bed,
   said web being of a dimension greater than the spacing of said anchorage means,
   means carried by said superstructure adjacent one of said anchorage means and defining a plurality of laterally spaced seats spaced different distances from the opposite anchorage means, and
   a rigid bar removably mounted at a selected seat and underlying said web to control the transverse dimension of the sling defined by said web.
3. A green tire carrier comprising
   a rigid frame having a bed and a superstructure,
   a pair of spaced parallel rigid horizontal bars carried by said superstructure,
   a flexible web supported at opposite margins thereof by said bars with its central portion suspended below the level of said bars,
   spaced transversely extending means carried by said superstructure adjacent to one of said bars and having a plurality of upwardly projecting abutments spaced different distances from said bars, and
   a removable rigid bar supported by said last named means at selected position and underlying said web to control the shape of the suspended part of said web.
4. A green tire carrier as defined in claim 1, and
   a separator bar spanning said superstructure above the level of said anchorage means to maintain a tire on said web in substntially upright position.
5. A green tire carrier as defined in claim 1, wherein transverse members define part of said superstructure adjacent the level of said anchoring means at opposite ends of said superstructure, and
   a plurality of abutments are carried by and spaced lengthwise of said transverse members to define said anchoring positioning means.

6. A green tire carrier as defined in claim 1, wherein said anchor positioning means constitutes a pair of spaced transversely extending rigid plates located adjacent one side of said superstructure and each having a plurality of notches in its upper margin for selectively receiving said removable anchoring means.

References Cited

UNITED STATES PATENTS

| | | | |
|---|---|---|---|
| 3,098,567 | 7/1963 | Steel | 211—49 |
| 3,136,425 | 6/1964 | Greenbury | 211—1 |
| 3,278,042 | 10/1966 | Frydenberg | 211—60 |

CHANCELLOR E. HARRIS, *Primary Examiner.*

K. J. WINGERT, *Assistant Examiner.*